March 17, 1959

B. L. GODBERSEN 2,878,057

RELEASABLE BOLSTER HOIST

Filed June 2, 1955

Witness
A. S. Martin

INVENTOR
Byron L. Godbersen

BY Talbert Dick Adler
ATTORNEY

United States Patent Office 2,878,057
Patented Mar. 17, 1959

2,878,057

RELEASABLE BOLSTER HOIST

Byron L. Godbersen, Ida Grove, Iowa

Application June 2, 1955, Serial No. 512,758

2 Claims. (Cl. 298—22)

This invention relates to hydraulic jack operated wagon bolster hoists and more particularly to ones that are secured to the wagon chassis and to the box to be elevated.

The use of hoists on farm wagons and trucks is most extensive. While there are various types, perhaps the best known and most universally used hoists are ones like or similar to the teachings in my issued United States Letters Patent, Number 2,698,199, issued on December 28, 1954, on a Hoist. Such hoists have one member hinged to the wagon chassis, another member hinged to the wagon box and with the two members in turn hinged to each other. Also the hydraulic jack may be independently secured to the vehicle chassis and operatively secured to the hoist. Regardless of the type of hoist, however, great damage is done if the vehicle turns over due to this connection of the hoist and the fact that the wagon box is detachable from the vehicle chassis. This upsetting of the vehicle is quite common. One reason for this is that the terrain may well be most uneven. Another reason is that the relatively light top heavy loaded wagon is drawn back of a tractor. Obviously, in the case of a turn over, the wagon box cannot roll free of the wagon chassis because it is linked to the chassis by the bolster hoist. Therefore, not only is the bolster hoist ruined, but the wagon and chassis usually suffer considerable damage. Furthermore, the accident may endanger the lives of the users.

Therefore, one of the principal objects of my invention is to provide a safety bolster hoist that will become disconnected automatically from the vehicle chassis in case of an accidental tip over thereby eliminating serious damage to the units and possible loss of life.

A further object of this invention is to provide a releasable wagon hoist that is easily and quickly installed.

Still further objects of my invention are to provide a wagon hoist that is economical in manufacture, and durable in use.

These and other objects will be apparent to those skilled in the art.

Figure 1:
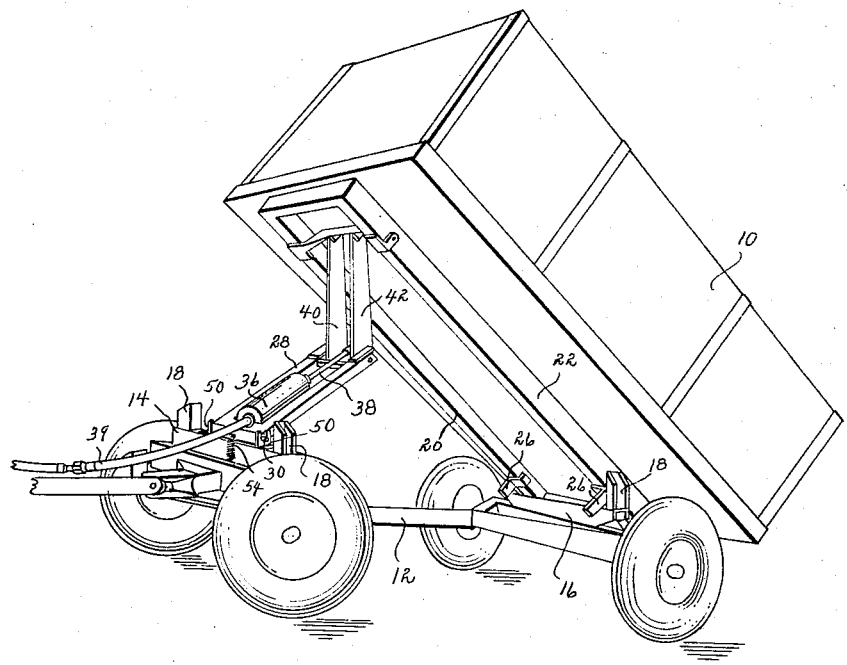
Figure 2:
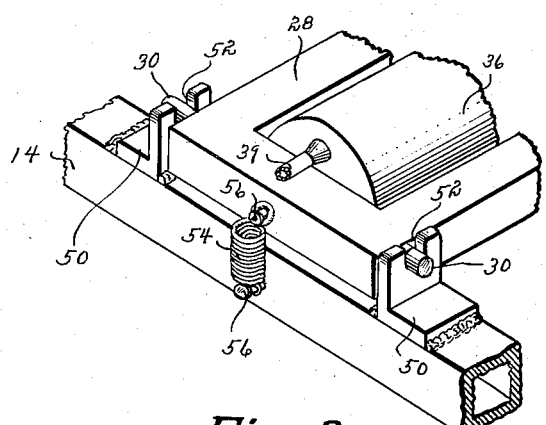

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of a hoist using my means for detachably securing the same to the chassis of a vehicle, and Fig. 2 is an enlarged perspective view of one way of detachably securing the hoist to the wagon chassis.

In these drawings I show a wagon and hoist, the parts of which are illustrated and described in my herebefore referred to patent, No. 2,698,199. The wagon box 10 is mounted on a wheel chassis 12. The forward portion of the chassis carries a bolster 14 mounted transversely on the wheels, and a like bolster 16 is similarly disposed at the rear of the chassis. Each end of each bolster is provided with a vertically disposed stop or abutment 18. In between these lateral stops and on the respective bolsters will rest portions of sides 20 and 22 of a frame mounted to the underside of the wagon body 10, as shown in Fig. 1. To prevent the rearward sliding movement of the body 10 on the bolster 16 when the front end of the wagon is raised for dumping, I have provided on the rear portions of the members 20 and 22 a depending bar 26 that engages the forward side of the bolster 16. By this arrangement of parts the forward end of the wagon box 10 may be raised without rearward sliding movement of the wagon on the chassis.

I have used the numeral 28 to designate the rectangular frame of my hoist having its forward end pivotally mounted to the bolster 14 so that its major axis is parallel to the longitudinal axis of the chassis 12. This member 28 when in collapsed condition extends rearwardly from the bolster 14 and stub shaft 30 projects from each side of the forward end of this frame 28, as shown in Fig. 2. Herebefore these stub shafts 30 have been rigidly secured to the bolster 14 by bearing members secured to the bolster. The numeral 36 designates an ordinary hydraulic jack mounted to the frame 28 for a pivotal movement therewith so that its piston rod 38 extends and retracts from the rearward side thereof. The numeral 39 designates a conduit hose leading to the cylinder of the hydraulic jack and adapted to be connected to the source of hydraulic power (not shown) as is well known in the art.

A pair of elongated lifting arms 40 and 42 are oppositely disposed and pivoted on the rear end of the frame 28. These arms 40 and 42 in turn are operatively pivotally secured to the members 20 and 22 near their forward end portions, as shown in Fig. 1. The hydraulic jack piston is operatively secured to the members 40 and 42 adjacent the rear end of the member 28. Usually this connection of the hydraulic jack is by leakage, as described in the aforesaid mentioned patent, so that when the piston 38 is reciprocated, the wagon box will be raised and lowered accordingly.

The specific details of the wagon chassis, the wagon box, and the hydraulically operated hoist, are not important to this invention inasmuch as it is confined to a means for detachably disconnecting the hoist from the vehicle chassis in case of accident or an upset. I will now describe one means of accomplishing this desired result.

On the bolster 14 and at each side of the frame 28 I provide a bracket 50. In Fig. 2 I show each of these brackets as L-shaped and they may be secured to the bolster by any suitable means such as bolts, rivets, or by welding. The upper vertical portion of each of the brackets has a receiving notch bearing 52, as shown in Fig. 2. These brackets are so arranged that the stub shafts 30 on the hoist frame 28 bear in these notches 52, as shown in Fig. 2. Thus, the brackets 50 act as open top bearings and obviously in case the wagon were upset the stub shafts could pass from the notches 52 and thereby free the hoist automatically from connection with the vehicle chassis. Various means may be employed to hold the stub shafts 30 in the notches 52 under normal conditions. Yieldable or easily broken pins or retainers may be employed. One good way of accomplishing the yielding retention of the stub shafts 30 in the bearing elements 50 is by a spring means, and this is the method shown in the drawings.

The numeral 54 designates a coil spring having one end connected to the center front end of the frame 28 and its other end connected to the front center of the bolster 14. The ends of this spring may be secured by any suitable means such as by the headed lugs 56, bolts, hooks, or like. The coil spring will yieldingly hold the stub shafts downwardly in the notches 52 and the hoist, under normal conditions, will function whenever called upon to raise and lower the wagon box. However, in case of an accident or the upsetting of the vehicle, the frame 28 will move upwardly against the resistance of the spring 54 until the stub shafts 30 are clear of the bearing members 50. At that time the hoist will become detached from rigid connection with the bolster 14 and no damage will result to either the vehicle, the wagon box, nor the hoist, due to the presence of the hoist. At most the only damage would be the replacement of a retaining spring 54.

Some changes may be made in the construction and arrangement of my releasable bolster hoist without departing from the real spirit and purpose of my invention, and it is my intention to cover by my claims, any modified forms of structure or use of mechanical equivalents which may be reasonably included within their scope.

I claim:

1. In combination, a hoist, a vehicle chassis, a wagon box on said chassis capable of having its front end raised and lowered relative to said chassis, two open top bearing elements on the forward end of said chassis, a hydraulic jack hoist operatively connected by its rearward end to the forward end portion of said box and two stub shafts extending laterally from the forward end of said jack hoist and resting in said two open top bearing elements, respectively, on the forward end of said chassis.

2. In combination, a hoist, a vehicle chassis, a wagon box on said chassis capable of having its front end raised and lowered relative to said chassis, two open top bearing elements on the forward end of said chassis, a hydraulic jack hoist operatively connected by its rearward end to the forward end portion of said box, two stub shafts extending laterally from the forward end of said jack hoist and resting in said two open top bearing elements, respectively, on the forward end of said chassis, and a spring means yieldingly connecting the forward end of said jack hoist to the forward end of said chassis.

References Cited in the file of this patent

UNITED STATES PATENTS

| | | |
|---|---|---|
| 2,166,722 | Kirksey | July 18, 1939 |
| 2,698,199 | Godbersen | Dec. 28, 1954 |